US010635520B2

(12) United States Patent
Li et al.

(10) Patent No.: US 10,635,520 B2
(45) Date of Patent: Apr. 28, 2020

(54) MONITORING METHOD AND MONITORING DEVICE OF DEEP LEARNING PROCESSOR

(71) Applicant: XILINX, INC., San Jose, CA (US)

(72) Inventors: Yi Li, Beijing (CN); Yi Shan, Beijing (CN)

(73) Assignee: XILINX, INC., San Jose, CA (US)

( * ) Notice: Subject to any disclaimer, the term of this patent is extended or adjusted under 35 U.S.C. 154(b) by 151 days.

(21) Appl. No.: 15/831,068

(22) Filed: Dec. 4, 2017

(65) Prior Publication Data

US 2018/0157548 A1 Jun. 7, 2018

(30) Foreign Application Priority Data

Dec. 5, 2016 (CN) .......................... 2016 1 1105459

(51) Int. Cl.
*G06F 11/07* (2006.01)
*G06N 3/063* (2006.01)
*G06F 11/30* (2006.01)

(52) U.S. Cl.
CPC ........ *G06F 11/079* (2013.01); *G06F 11/0721* (2013.01); *G06F 11/30* (2013.01); *G06F 11/3024* (2013.01); *G06F 11/3055* (2013.01); *G06N 3/063* (2013.01)

(58) Field of Classification Search
CPC ............ G06F 11/0721; G06F 11/0751; G06F 11/079; G06F 11/3024; G06N 3/063
See application file for complete search history.

(56) References Cited

U.S. PATENT DOCUMENTS

| | | | | |
|---|---|---|---|---|
| 5,919,267 A | * | 7/1999 | Urnes | ................ G06F 11/0736 714/26 |
| 2008/0177990 A1 | * | 7/2008 | Banerjee | ............ G06F 9/30156 712/227 |
| 2019/0095794 A1 | * | 3/2019 | Aldana Lopez | ....... G06N 3/082 |
| 2019/0155678 A1 | * | 5/2019 | Hsiong | ............... G06F 11/0772 |

* cited by examiner

*Primary Examiner* — Joseph R Kudirka
(74) *Attorney, Agent, or Firm* — Patterson + Sheridan, LLP

(57) ABSTRACT

Monitoring method and a monitoring device of a deep learning processor, which can effectively monitor running of the deep learning processor, capture an abnormal status in an arbitrary working state, and make the deep learning processor return to a normal state in time is presented. The monitoring method comprises: initializing standard data and storing a standard calculation result corresponding to the standard data, sending the standard data to the deep learning processor, receiving a calculation result returned by the deep learning processor, comparing the received calculation result with the stored standard calculation result, and judging the state of the deep learning processor in accordance with the result of the comparison, judging that the state of the deep learning processor is normal when the compared results are consistent, and judging that the deep learning processor is abnormal when the compared results are inconsistent.

4 Claims, 5 Drawing Sheets

MONITORING METHOD AND MONITORING DEVICE OF DEEP LEARNING PROCESSOR

RELATED APPLICATIONS

The present application claims priority to Chinese Patent Application Serial No. CN 201611105459.3, filed Dec. 5, 2016, which is herein incorporated by reference in their entirety.

TECHNICAL FIELD

The invention relates to the field of artificial neural network technology, and in particular to a monitoring method and a monitoring device of a deep learning processor in this field.

BACKGROUND

Along with development of semiconductor technology, a calculating capacity of hardware is rapidly enhanced, and processing time of various big data is gradually reduced. On this basis, artificial neural network technology is also further improved. In particular, such artificial neural network characterized by calculation intensity as deep learning is gradually largely applied in the fields such as computer vision, image and video recognition, and natural language processing.

Meanwhile, the scale of such artificial neural network as the deep learning is in constant growth, and comparatively advanced links of the neural networks currently published have reached hundreds of millions. Thus, a general-purpose processor (CPU) or a graphics processor (GPU) currently adopted in a calculating system to achieve the calculation of the artificial neural network will face the following challenges: along with a gradual approach of a transistor circuit to a limit, the Moore's law will come to an end, and a performance enhancement is no longer significant. A simple enhancement of a calculation performance has been gradually unable to meet gradually increasing requirements for the calculation of the artificial neural network. A deep learning processor born for this reason becomes a feasible solution, and shows a great potential.

The deep learning processor is a dedicated calculating device designed with respect to operation characteristics of a compressed artificial neural network, and is connected to the current calculating system as an external calculating device, and the compressed artificial neural network is configured in the deep learning processor in the form of initialized parameters. Thus, the deep learning processor can perform calculations of input data according to the configured neural network, and obtain a final calculation result rapidly and effectively.

The deep learning processor serves as a circuit calculating device, and the accuracy of the calculation result thereof naturally should be ensured. But since various interferences exist in an electronic system, in addition to making security in terms of a hardware design, it is further required to further enhance stability thereof by means of a good monitoring mechanism. But as mentioned above, the deep learning processor is the dedicated calculating device designed with respect to the operation characteristics of the compressed artificial neural network, the data processed thereby have correlations, and the previous method of adding a check bit to data cannot be used to check whether a calculating structure of the deep learning processor is accurate. Thus, there is a difficulty to well monitor the deep learning processor during its running. But if the deep learning processor cannot be well monitored, the abnormality of the deep learning processor cannot be found timely and accurately, so that the calculation result of the whole calculating system is inaccurate.

SUMMARY

With respect to the problems above, some embodiments of the invention provides a monitoring method and a monitoring device of a deep learning processor, which can well monitor the deep learning processor during its running to thereby ensure that a calculation result thereof is accurate.

Some embodiments provide a monitoring method of a deep learning processor, characterized by comprising steps of: initializing standard data and storing a standard calculation result corresponding to the standard data, sending the standard data to the deep learning processor, receiving a calculation result returned by the deep learning processor, comparing the received calculation result with the stored standard calculation result, and judging the state of the deep learning processor in accordance with the result of the comparison, judging that the state of the deep learning processor is normal when the compared results are consistent, and judging that the deep learning processor is abnormal when the compared results are inconsistent.

Further, in some embodiments, the monitoring method of a deep learning processor further comprises a step of: judging a running state of the deep learning processor, and determining a manner of sending the standard data in accordance with the running state of the deep learning processor.

Further, in some embodiments, when it is judged that the deep learning processor is in a waiting state, the standard data is periodically sent to the deep learning processor at a time interval, and when it is judged that the deep learning processor is in a calculating state, calculation tasks are separated, and the standard data is sent to the deep learning processor in intervals of the calculation tasks.

Further, in some embodiments, the standard data is randomly generated, or generated with respect to a specific input and output organization, and the corresponding standard calculation result is obtained beforehand by means of a calculation by a neural network the same as that configured on the deep learning processor.

Some embodiments further provide a monitoring device of a deep learning processor, characterized by comprising: an initializing module that initializes standard data and stores a standard calculation result corresponding to the standard data, a data sending module that sends the standard data to the deep learning processor, a data receiving module that receives a calculation result returned by the deep learning processor, a comparing module that compares the received calculation result with the stored standard calculation result, and a result judging module that judges the state of the deep learning processor in accordance with the result of the comparison by the comparing module, judging that the state of the deep learning processor is normal when the compared results are consistent, and judging that the deep learning processor is abnormal when the compared results are inconsistent.

In some embodiments, the monitoring device of a deep learning processor further comprises: a state judging module that judges a running state of the deep learning processor, and determines a manner of sending the standard data in accordance with the running state of the deep learning processor.

In some embodiments, when the state judging module judges that the deep learning processor is in a waiting state, the data sending module periodically sends the standard data to the deep learning processor at a time interval, and when the state judging module judges that the deep learning processor is in a calculating state, calculation tasks are separated, and the data sending module sends the standard data to the deep learning processor in intervals of the calculation tasks.

With embodiments of the monitoring method and monitoring device as described above, running of the deep learning processor can be effectively monitored, an abnormal status in an arbitrary working state can be captured, and the deep learning processor can be made to return to a normal state in time.

BRIEF DESCRIPTION OF THE DRAWINGS

Some embodiments of the invention are described below with reference to the following figures. In the figures.

DETAILED DESCRIPTION

Embodiments of the invention are described below with reference to the figures, which are exemplary, are only used to explain the embodiment of the invention and cannot be understood as limitations of the invention.

Figure 1:
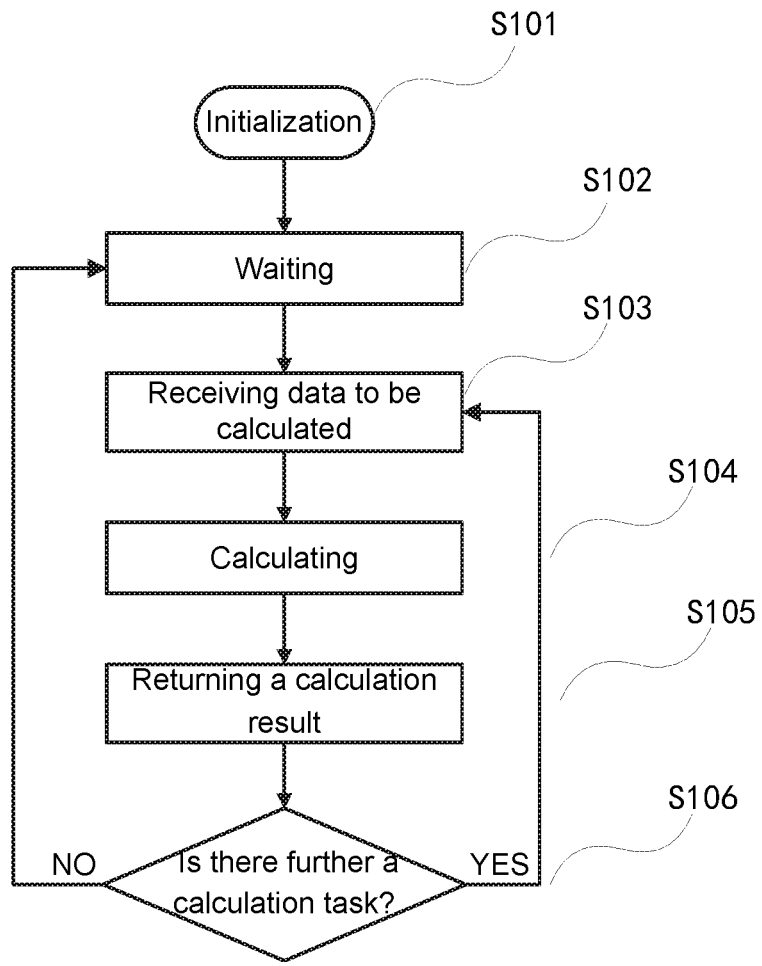
FIG. 1 is a diagram showing a work flow of a deep learning processor.

A work flow of a deep learning processor is firstly introduced. The deep learning processor is connected to an existing computer system (including a general purpose computer, a sensor and the like) as an external device. FIG. 1 shows a basic work flow of the deep learning processor, comprising steps of:

S101: The deep learning processor is initialized using compressed neural network parameters according to requirements.

S102: After being initialized, the deep learning processor enters a waiting state to wait for a calculation task to send data.

S103: When the calculation task arrives, the deep learning processor starts to receive data to be calculated. Generally, the data are organized by using a certain amount of data as one frame, and are sent and calculated by frames.

S104: The deep learning processor enters a calculating state.

S105: The deep learning processor returns a calculation result after completing the calculation.

S106: It is judged whether there is further a calculation task. When the result of the judgment is "YES", i.e., there is further a calculation task, Step S103 is returned to for continuously receiving the data and performing the calculation. When the result of the judgment is "NO", i.e., there is no calculation task, Step S102 is returned to for entering the waiting state.

As seen from the work flow of the deep learning processor described above, the deep learning processor mainly has the following two states during its running: the waiting state without the calculation task, and the calculating state of carrying out the task. The object to be achieved by monitoring the deep learning processor is to ensure, on the one hand, that the processor is not rendered abnormal due to any accident in the waiting state, and can enter the calculating state without error, and ensure, on the other hand, that a wrong operation result will not be resulted in due to unexpected factors in the calculating state of carrying out the task.

Based on the work flow of the deep learning processor, some embodiments of the invention provide good monitoring for various running states of the deep learning processor above. The use of the monitoring method can ensure running stability of the deep learning processor, and ensure that the abnormality of the deep learning processor is found timely and accurately, and the deep learning processor can return to a normal working state.

Figure 2:
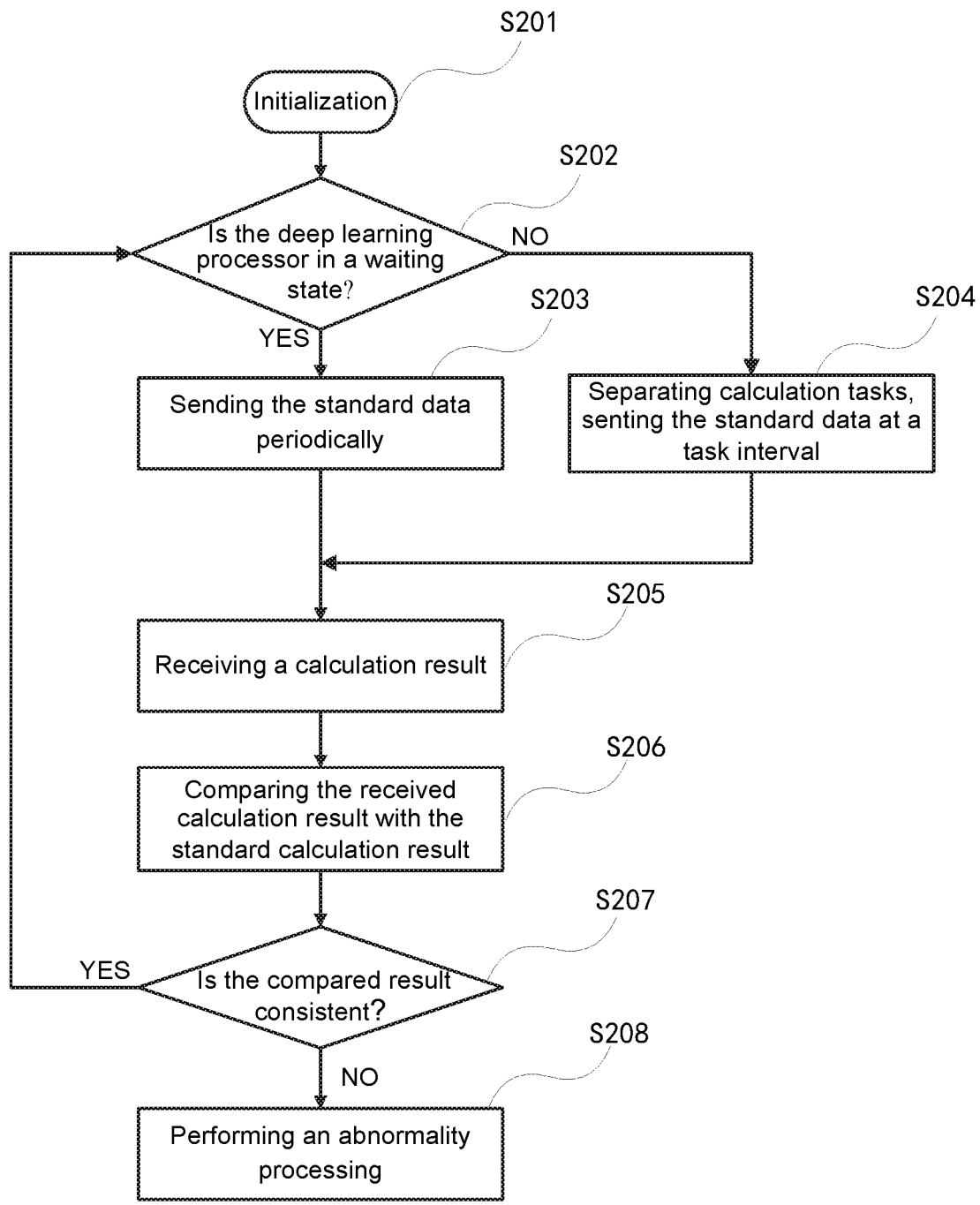
FIG. 2 is a diagram showing an embodiment of a work flow of a monitoring method.

A work flow of the monitoring method according to some embodiments is introduced below. FIG. 2 shows a basic work flow of an example embodiment of the monitoring method, and in order to achieve the object above, the monitoring method involved in the invention mainly comprises steps of:

S201: Standard data is initialized and a standard calculation result corresponding to the standard data is stored. The standard data is generally a frame of data, and the standard calculation result is generally obtained beforehand by means of a calculation in the form of software or in other forms by a neural network the same as that configured on the deep learning processor.

S202: It is judged whether the deep learning processor is in a waiting state. When the result of the judgment is "YES", i.e., the deep learning processor is in the waiting state, Step S203 is performed; when the result of the judgment is "NO", i.e., the deep learning processor is in a calculating state, Step S204 is performed.

S203: It has been judged in this case that the deep learning processor is in the waiting state, and in the waiting state, the standard data is periodically sent to the deep learning processor at a time interval.

S204: It has been judged in this case that the deep learning processor is in the calculating state, in the calculating state, since the normal calculation cannot be influenced due to the monitoring, it is required to separate calculation tasks, a task interval is selected after certain calculating tasks are completed, and the standard data is sent to the deep learning processor.

S205: A calculation result returned by the deep learning processor is received.

S206: The calculation result retuned by the deep learning processor that is received in Step 205 is compared with the standard calculation result stored in Step S201.

S207: By means of the comparison performed in Step S206, it is judged whether the calculation result returned by the deep learning processor is consistent with the standard calculation result. When the result is "YES", it is judged that the running state of the deep learning processor is normal, and Step S202 is returned to for continuously performing a monitoring flow. When the result is "NO", it is judged that the deep learning processor is abnormal, and Step S208 is performed.

S208: It has been judged in this case that the deep learning processor is abnormal, an abnormality processing is performed, and the deep learning processor is reset and reconfigured to be made to return to the normal working state. Wherein, when an abnormality occurs in the calculating state, it is required to make a backup storage of the calculation task that is currently abnormal. When the deep learning processor returns to the normal state, it is required to recalculate the abnormal calculation task.

By means of the monitoring method above, running of the deep learning processor can be effectively monitored, an abnormal status in an arbitrary working state can be captured, and the deep learning processor can be made to return to a normal state in time.

Figure 3:
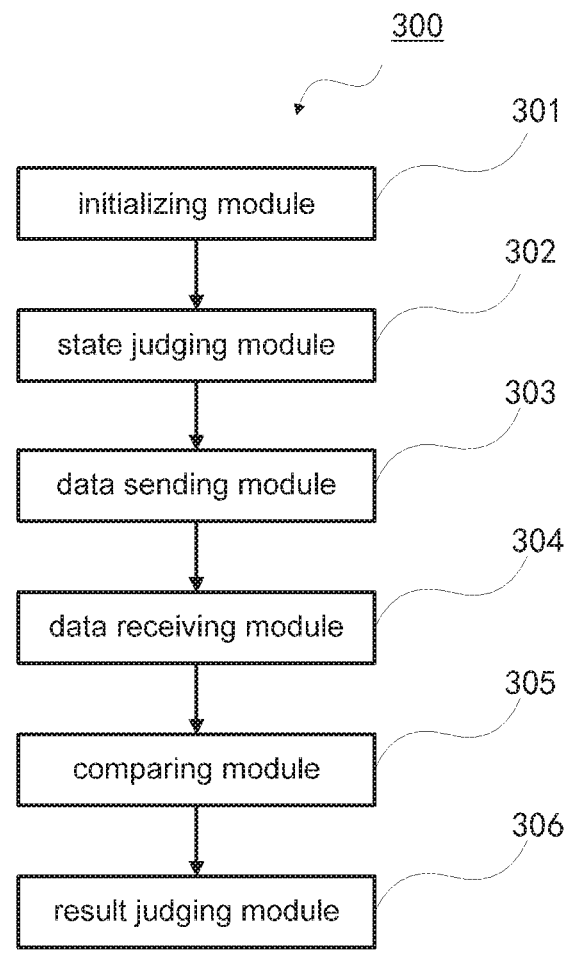
FIG. 3 is a block diagram showing an embodiment of a structure of a monitoring device.

The monitoring method above can be designed as one that is achieved by a series of functional modules. FIG. 3 shows a structure block diagram of an example monitoring device according to some embodiments. A monitoring device 300 comprises an initializing module 301, a state judging module 302, a data sending module 303, a data receiving module 304, a comparing module 305, and a result judging module 306. The initializing module 301 initializes standard data and stores a standard calculation result corresponding to the standard data. The state judging module 302 judges whether the running state of the deep learning processor is a waiting state or a calculating state, and sends the result of the comparison to the data sending module 303. When the deep learning processor is in the waiting state, the data sending module 303 periodically sends the standard data to the deep learning processor at a time interval; when the deep learning processor is in the calculating state, calculation tasks are separated, and the data sending module 303 sends the standard data to the deep learning processor in intervals of the calculation tasks. The data receiving module 304 receives a calculation result returned by the deep learning processor. The comparing module 305 compares the calculation result received by the data receiving module with the stored standard calculation result. The result judging module 306 judges the state of the deep learning processor in accordance with the result by the comparing module, judging that the running state of the deep learning processor is normal when the received calculation result is consistent with the stored standard calculation result, and judging that the deep learning processor is abnormal when the received calculation result is inconsistent with the stored standard calculation result.

Figure 4:
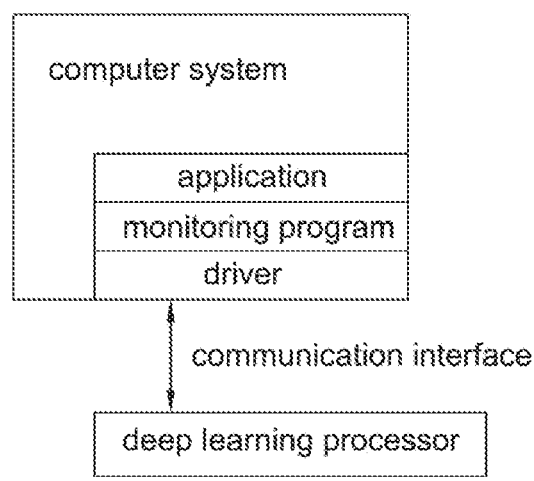
FIG. 4 is a structure diagram of a computer system involved in some embodiments of the invention.

One specific example embodiment of the invention runs in a computer system to which a deep learning processor is connected, and exists in the form of a monitoring program. FIG. 4 shows the structure of the computer system. As shown in FIG. 4, the deep learning processor is connected to the computer system via PCIE or other communication interfaces. The monitoring program is located between a driver layer and an application layer of the computer system. Herein, the driver layer deals with communication interface affairs, and is mainly responsible for data interactions with the deep learning processor; the application layer is responsible for initiations and terminations of various calculation tasks.

The entire computer system where the deep learning processor works can be subjected to an initialization configuration so as to enter a normal working state. Deep learning is generally achieved by a multilayer neural network, and the initialization configuration herein just describes the composition of the multilayer neural network. Meanwhile, the monitoring program also initializes the standard data and the corresponding standard calculation result. The standard data can be randomly generated, or generated with respect to a specific input and output organization as long as requirements for the input data by the multilayer neural network are satisfied. The corresponding standard calculation result shall be obtained after the multilayer neural network calculates the standard data in other forms (e.g., software).

After the deep learning processor starts to run, the monitoring program also enters the monitoring state. All the calculation tasks of the application layer undergo the monitoring program and then are sent to the deep learning processor, and the results returned by the deep learning processor also undergo the monitoring program and are returned to the calculation tasks of the application layer.

Figure 5:
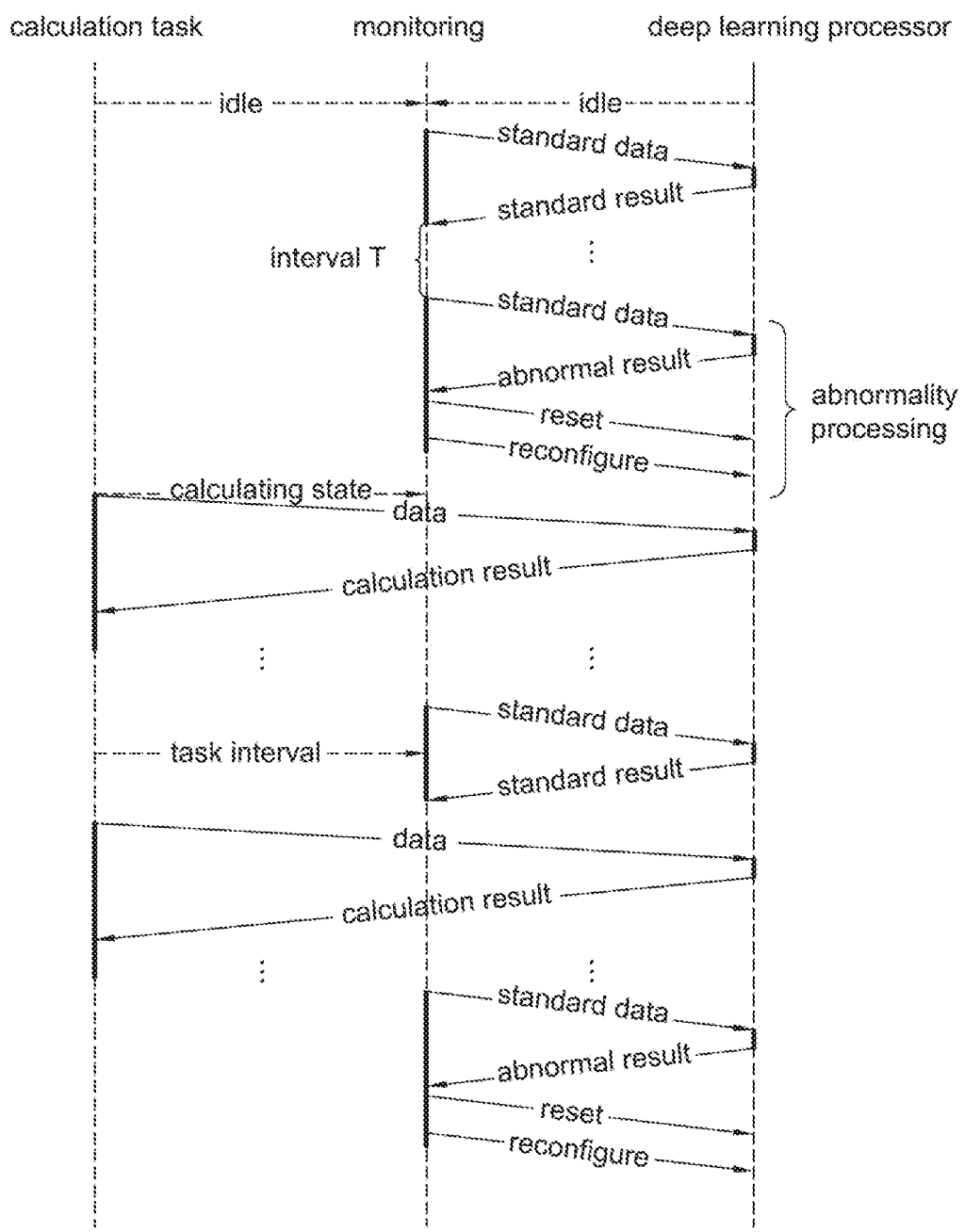
FIG. 5 is a sequence diagram of a monitoring flow involved in some embodiments of the invention.

FIG. 5 shows a sequence diagram of the monitoring flow. As shown in FIG. 5, the monitoring program will periodically send the standard data to the deep learning processor at a time interval T when finding that the deep learning processor is in the waiting state, and the deep learning processor returns the calculation result after receiving the standard data. After receiving the calculation result returned by the deep learning processor, the monitoring program compares it with the standard calculation result. If the results are consistent, it indicates that the state of the deep learning processor is normal. If the results are inconsistent, it indicates that the deep learning processor is abnormal, and at this time, it is required to perform a reset operation on the deep learning processor, and newly perform an initialization operation, so that the deep learning processor enters the normal working state.

Furthermore, the monitoring program will separate the calculation tasks sent to the deep learning processor when finding that the deep learning processor is in the calculating state. The calculation tasks are generally grouped by using N as a scale. In order to ensure that the calculations before and after the separation are independent of each other, in some cases, the calculation tasks will be separated using an integer close to N. Then, the standard data is sent in the intervals of the calculation tasks. After the calculation result returned by the deep learning processor is received, it is compared with the standard calculation result. If the results are consistent, it indicates that the state of the deep learning processor is normal, and it is allowed to continue to carry out the subsequent calculation tasks. If the results are inconsistent, it indicates that the deep learning processor is abnormal. At this time, it is required to firstly save the calculation task of the current group, and then reset the deep learning processor and perform reinitialization. After the reinitialization, it is required to reuse the standard data to perform one calculation, and reprocess the saved calculation task that goes wrong after affirming that the deep learning processor is normal. In this case, it is also required to perform processing through the monitoring program, and further continue to carry out the subsequent calculation tasks after ensuring that the result is correct.

Preferred embodiments of the invention are recorded above, and those skilled in the art absolutely can make various changes on this basis. For example, in the above embodiments, when it is judged that the deep learning processor is in the calculating state, the calculation tasks are separated, and the standard data is sent to the deep learning processor in the intervals of the calculation tasks, but other manners can be also adopted as long as the normal calculation tasks are not influenced.

In summary, the specific and scope of the invention are not limited to the specific contents disclosed herein. Those skilled in the art can make more implementation modes and applications in accordance with the teaching of the invention, and these implementation modes and applications are all within the spirit and scope of the invention. The spirit and scope of the invention are not limited by the specific embodiments, but are limited by the claims.

What is claimed is:

1. A monitoring method of a deep learning processor, comprising:
   initializing standard data and storing a standard calculation result corresponding to the standard data;
   judging a running state of the deep learning processor;
   sending the standard data to the deep learning processor in accordance with the running state of the deep learning processor wherein:
   the standard data is periodically sent to the deep learning processor at a time interval when the deep learning processor is in a waiting state, and the standard data is sent to the deep learning processor in intervals of time between calculation tasks when the deep learning processor is in a calculating state;
   receiving a calculation result returned by the deep learning processor;
   comparing the received calculation result with the stored standard calculation result;
   judging that a state of the deep learning processor is normal when the compared results are consistent; and
   judging that the state of the deep learning processor is abnormal when the compared results are inconsistent.

2. The method of a deep according to claim 1, wherein:
   the standard data is randomly generated or generated with respect to a specific input and output organization, and the standard calculation result is obtained beforehand by a calculation by a neural network which is the same as a calculation configured on the deep learning processor.

3. A computer system for monitoring a deep learning processor, the computer system comprising memory storing a program, the computer system being configured by execution of the program to:
   initialize standard data and storing a standard calculation result corresponding to the standard data;
   judge a running state of the deep learning processor;
   send the standard data to the deep learning processor in accordance with the running state of the deep learning processor wherein when it is judged that the deep learning processor is in a waiting state, the standard data is periodically sent to the deep learning processor at a time interval, and when it is judged that the deep learning processor is in a calculating state, calculation tasks are separated, and the standard data is sent to the deep learning processor in intervals of the calculation tasks;
   receive a calculation result returned by the deep learning processor;
   compare the received calculation result with the stored standard calculation result;
   judge that a state of the deep learning processor is normal when the compared results are consistent; and
   judge that the state of the deep learning processor is abnormal when the compared results are inconsistent.

4. The computer system according to claim 3, wherein:
   the standard data is randomly generated or generated with respect to a specific input and output organization, and the standard calculation result is obtained beforehand by a calculation by a neural network which is the same as a calculation configured on the deep learning processor.

* * * * *

UNITED STATES PATENT AND TRADEMARK OFFICE
CERTIFICATE OF CORRECTION

PATENT NO. : 10,635,520 B2  
APPLICATION NO. : 15/831068  
DATED : April 28, 2020  
INVENTOR(S) : Yi Li and Yi Shan Page 1 of 1

It is certified that error appears in the above-identified patent and that said Letters Patent is hereby corrected as shown below:

In the Claims

Column 7, Line 27, Claim 2, delete "of a deep".

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*